United States Patent [19]

Khan et al.

[11] 4,186,493
[45] Feb. 5, 1980

[54] TELESCOPING CARPENTER'S SCALE

[76] Inventors: Amir U. Khan, c/o The International Rice Research Institute, P.O. Box 1237, Islamabad, Pakistan; Habib U. Khan, 705 Waite Rd., Maumee, Ohio 43537; Ahamed A. Amid, 299 Rivers End, Gahanna, Ohio 43230

[21] Appl. No.: 934,177

[22] Filed: Aug. 16, 1978

[51] Int. Cl.² ............................................... G01B 3/08
[52] U.S. Cl. ..................................................... 33/161
[58] Field of Search .................... 33/103, 107 R, 161

[56] References Cited

U.S. PATENT DOCUMENTS

| 844,536 | 2/1907 | Prindle | 33/161 |
|---|---|---|---|
| 904,830 | 11/1908 | Boeck | 33/161 |
| 1,119,450 | 12/1914 | Parr | 33/161 |
| 1,629,829 | 5/1927 | Linn | 33/161 |

FOREIGN PATENT DOCUMENTS 216574 11/1909 Fed. Rep. of Germany ............. 33/161

*Primary Examiner*—Richard R. Stearns
*Attorney, Agent, or Firm*—Oliver E. Todd, Jr.

[57] ABSTRACT

A straight edge comprising a plurality of longitudinal members that are positioned together in slidably telescoping relationship. At least one longitudinal edge of the members forms a substantially straight edge throughout the telescoping range of the longitudinal members. The extended members preferably are marked with graduations along the straight edge.

3 Claims, 9 Drawing Figures

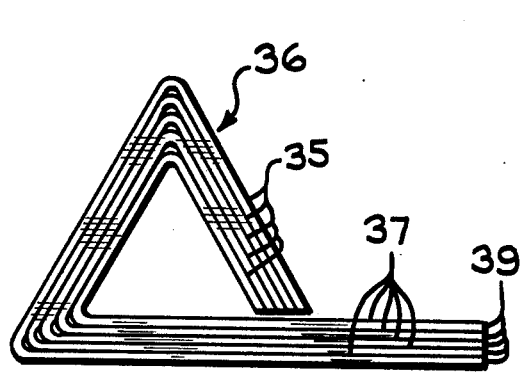
FIG. 5
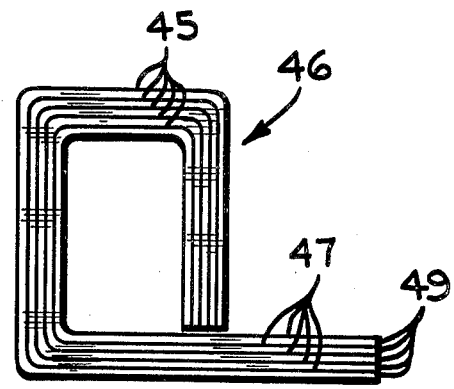
FIG. 6
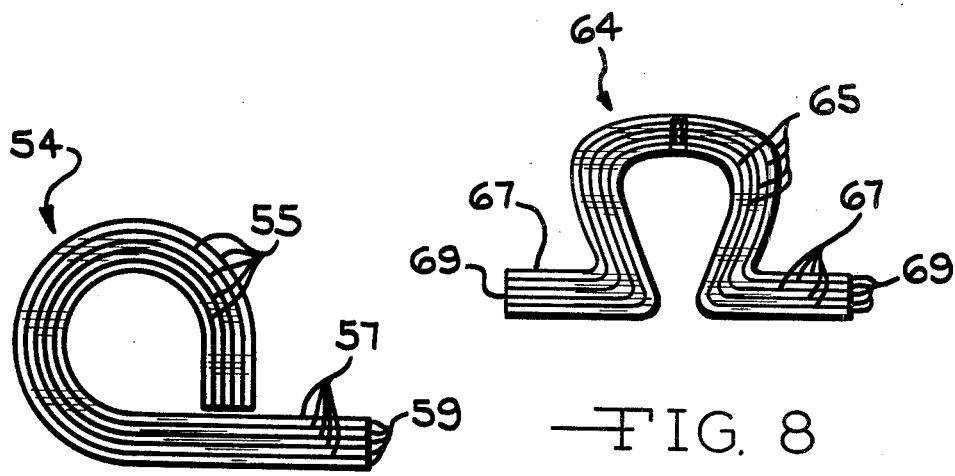
FIG. 7
FIG. 8
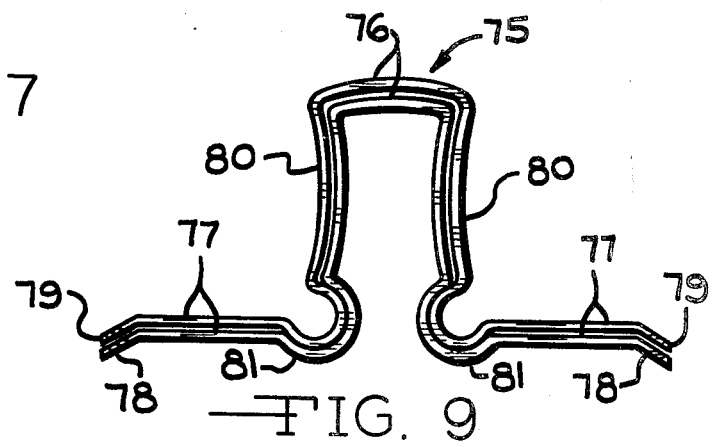
FIG. 9

TELESCOPING CARPENTER'S SCALE

BACKGROUND OF THE INVENTION

This invention pertains to a telescoping straight edge or scale. In one of its more specific aspects, the invention relates to a telescoping scale where the edge of the scale forms a substantially straight edge throughout the telescoping range of the scale.

The conventional carpenter scale, which has been used in the past, is comprised of a plurality of small sections that are pivotally connected together to form an extendable scale. However, this extendable scale has a number of shortcomings that limit the usefulness of the scale. One of the major difficulties in using this type of scale is that when measuring in a horizontal plane, the weight of the cantilevered portion of the scale is often great enough to cause a portion of the scale to pivot in a direction away from the horizontal plane that is being measured. This problem becomes more significant as the scale becomes older and the force required to cause the sections to pivot is reduced. Thus, it can be very inconvenient to use this type of extendable scale when measuring in a generally horizontal plane.

Another shortcoming of this type of prior art extendable scale is that sudden or quick movements of the extended scale will frequently cause the scale to pivot around one of the points at which the sections are connected. The problem of having the extended scale close or pivot, when a sudden motion is applied to the scale, is very difficult to overcome without increasing the frictional engagement at the pivot points of the scale to a level that makes it very difficult to pivot the small sections during normal opening and folding of the scale.

Another drawback of the prior art extendable scale is that the scale does not present a very good straight edge when the scale is in the extended position. The pivot joints between the section of the scale are frequently slightly out of alignment so that the individual sections do not form a good straight edge when the scale is extended. In addition, even if the scale is constructed with a great deal of precision so that the scale formed a good straight edge when the scale is extended, use of the scale eventually causes the joints between the sections of the scale to become misaligned and, therefore, impair the straightness of the edge of the extended scale.

SUMMARY OF THE INVENTION

According to the present invention, an improved extendable scale is provided which eliminates the problems with pivotal joints found in prior art extendable scales and also provides an edge which is maintained straight as the scale is extended. The scale includes a plurality of telescopically stacked longitudinal members. Each of the members includes a longitudinal edge which is straight and parallel with the similar edges of the other longitudinal members. These edges form a straight edge throughout the telescoping range of the longitudinal members. Preferably, scale graduations are also marked along the straight edges of the individual members.

Accordingly, it is desirable to construct and extendable scale or straight edge that will not significantly sag or bend when it is being used and that will provide a substantially straight edge throughout the extended range of the scale.

According to the invention there is provided a straight edge comprising a plurality of longitudinal members that are positioned together in a slidably telescoping relationship. At least one longitudinal edge of the members form a substantially straight edge throughout the telescoping range of the longitudinal members.

This invention relates to an extendable straight edge or scale. The particulars of this invention will be more fully understood by referring to the attached drawings in connection with the following description.

BRIEF DESCRIPTION OF THE DRAWINGS

FIG. 5 is an end elevation view of a modified embodiment of the scale;

FIG. 6 is an end elevation view of another modified embodiment of the scale;

FIG. 7 is an end elevation view of another modified embodiment of the scale;

FIG. 8 is an end elevation view of another modified embodiment of the scale; and FIG. 9 is an end elevation view of still another modified embodiment of the scale.

DESCRIPTION OF THE PREFERRED EMBODIMENTS

Figure 1:
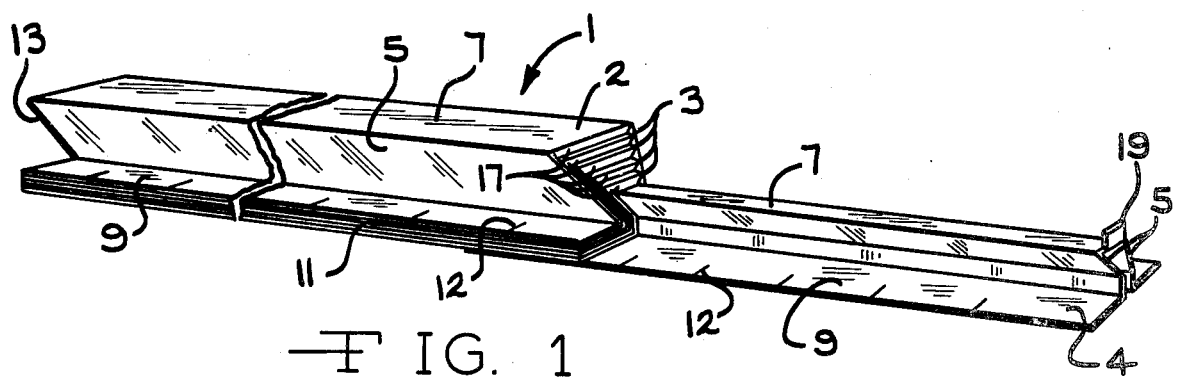
FIG. 1 is a perspective view of the telescoping straight edge or scale of the present invention.
Figure 2:
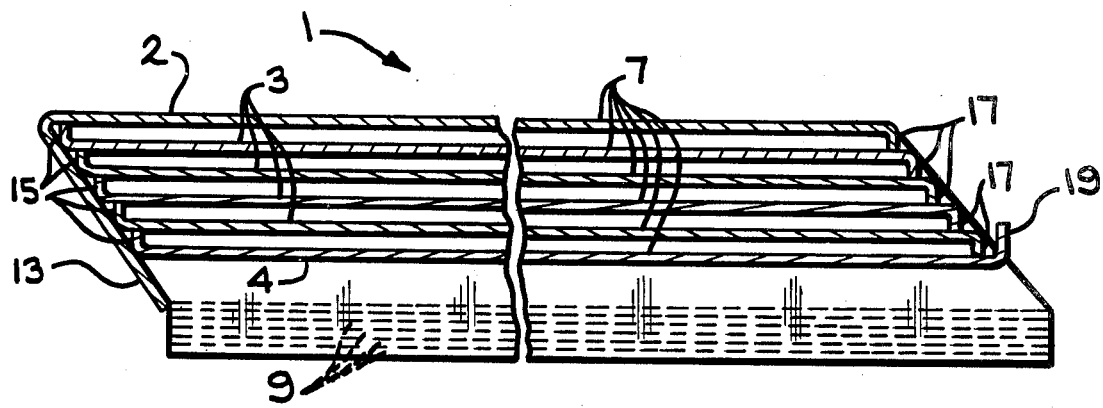
FIG. 2 is a side elevation cross-sectional view of the telescoping scale taken along line 2—2 of FIG. 3.
Figures 3, 4:
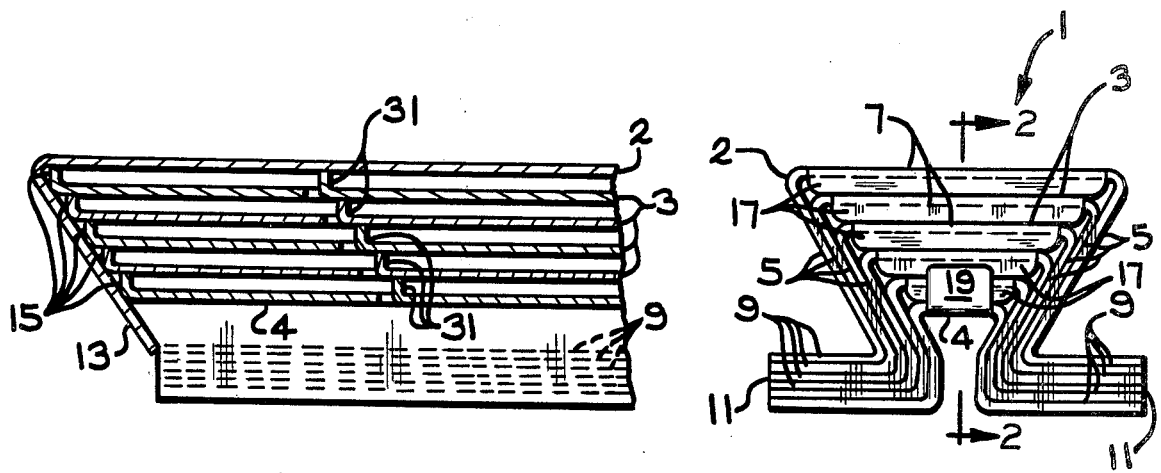
FIG. 3 is a right end elevational view of the telescoping scale.
FIG. 4 is a fragmentary side elevation cross-sectional view showing a modified embodiment of the telescoping scale.

In FIG. 1, 2 and 3 a collapsible straight edge or scale 1 is comprised of an outer longitudinal member 2, a plurality of longitudinal members 3, and an inner longitudinal member 4 which are positioned together in slidably telescoping relationship. The longitudinal members 2-4 each have sidewalls 5, a top wall 7, and a base portion 9 that extends from each sidewall of the longitudinal members. The base portions 9 on either side of the scale 1 terminate in parallel edges 11 which forms a substantially straight edge on each side of the scale. Gradations of linear measurement 12 can be placed along the base portions 9 of the longitudinal members to allow the longitudinal members to be used as a measuring device.

The sidewalls 5 of each of the longitudinal members 2 and 3 are positioned so that they resiliently and frictionally engage the sidewalls of an adjacent, inner one of the longitudinal members 3 or 4. The engagement is of a level that requires an external force to be applied to the longitudinal members to cause telescoping sliding of the longitudinal members with respect to one another.

The outer longitudinal member 2 of the scale 1 has an end wall 13 that extends from the top wall 7 of the outer member to the base portions 9 of the outer member. The wall 13 is constructed so that it substantially encloses an end of the straight edge between the top wall 7 and the base portions 9 of the outer member. One end of the top wall 7 and sidewalls 5 of the longitudinal members 3 and 4 will generally be in contact with the end wall 13 when the longitudinal members 3 and 4 are collapsed or positioned in non-telescoped relationship. Each of the longitudinal members 3 and 4 has a tab 15 that is located at the end of the top wall 7 of the members that is adjacent the wall 13. The tabs 15 extend in a direction toward the top wall 7 of the outer longitudinal member 2. Each of the tabs 15 extends upwardly so that it abuts the top wall 7 of the adjacent outer one of the longitudinal members 3 or 2. The tabs 15 are shown positioned on the end of the longitudinal members that is adjacent to the wall 13. On the other end of the longitudinal member 2 and 3, there are positioned tabs 17 that extend downwardly from the top wall 7 of the longitudinal members toward the base of the longitudinal members. Each of the tabs 17 abuts the top wall 7 of the adjacent inner longitudinal member 3 or 4. The inner longitudinal member 4 has a projection 19 extending upwardly from the end thereof which extends toward the the top wall of the outer longitudinal member 2. The projection 19 is of the length so that the projection extends at least beyond the top wall 7 of the adjacent longitudinal member 3 to facilitate extending the member 4.

The operation of this invention will be more fully understood by referring to FIG. 1, 2 and 3 in relation to the following description. The straight edge or scale 1 can be used in the form shown in FIG. 2 for a number of applications. However, when the piece being measured or the length of the straight edge required, exceeds the length of the base 9 of the outer longitudinal member 2 the longitudinal members can be slid in telescoping relationship to extend the length of the straight edge or scale 1. The telescoping of the longitudinal members 2-4 is usually accomplished by engaging the projection 19, on the inner longitudinal member 4, and supplying a force great enough to overcome the frictional engagement between the sidewalls 5 of the adjacent longitudinal members. This force will cause the inner longitudinal member 4 to telescopingly slide with respect to the other longitudinal members. The inner longitudinal member 4 will continue to slide until the end projection 15 on the inner longitudinal member 4 engages the projection 17 on the adjacent longitudinal member 3. If additional force is supplied to the projection 19 the adjacent longitudinal member 3 also will be caused to slide in telescoping relationship. The movement of the adjacent longitudinal member will continue until its projection 15 engages projection 17 on the next immediately adjacent longitudinal member 3. Thus, it can be seen that as force is continuously supplied to the projection 19 the longitudinal members will sequentially slide in telescoping relationship and extend the length of the straight edge 11 or scale 12. This telescoping will continue until the projection 15 on the last longitudinal member 3 engages the projection 17 on the outer longitudinal member 2. As the longitudinal members telescopingly extend, the base portions 9 and edges 11 on each longitudinal member will also extend in telescoping relationship. It should be noted that the edges 11 on the base portions 9 will maintain a substantially straight edge throughout the telescoping range of the longitudinal members.

In the above description, the straight edge or scale has been described as being caused to telescope by engaging the projection 19 on the inner longitudinal member 4 so that the longitudinal members will telescope in sequential fashion from the inner longitudinal member 4 to the outer longitudinal member 2. However, it should be noted that the straight edge can be caused to telescope by engaging the outer longitudinal member 2 and supplying a force that will cause the wall 13 to move away from the other longitudinal members. In this case the outer longitudinal member 2 will move in telescoping relationship until tab 17 engages tab 15 on the adjacent longitudinal member 3. When the tabs are engaged the adjacent longitudinal member 3 will be caused to move in telescoping relationship and this telescoping will continue in sequential fashion as long as the force is supplied to the outer longitudinal member 2 or until the tab 17 on the longitudinal member 3 engages the tab 15 on the inner longitudinal member 4. Thus, it should be recognized that the straight edge or scale can be caused to telescope in either direction. Accordingly, the gradations of linear measurement 12 positioned on the base portions 9 may be marked to accomodate telescoping in either direction by the scale.

FIG. 4 shows an additional embodiment of the invention where second tabs 31 have been positioned on the longitudinal members 3 and 4. The second tabs 31 are substantially similar in construction to the previously described tabs 15 with the exception that the second tabs 31 are spaced apart from the end region of the longitudinal members. The function of the second tabs 31 is substantially similar to the previously described tab 15. However, the tabs 31 reduce the telescoping movement of the longitudinal members and, accordingly, reduce the length of the fully telescoped straight edge or scale. The second tabs 31 insure that there is a predetermined amount of overlap between the adjacent longitudinal members 2-4 during the telescoping of the straight edge or scale. This overlap improves the structural rigidity of the straight edge and reduces any possible tendency of the straight edge to sag or bend. The spacing of the second tabs 31 from the end of the longitudinal members will usually be from one-eighth to one-third of the length of that longitudinal member. However, the second tabs can be spaced at different intervals from the end region of the longitudinal member to provide different degrees of structural rigidity that may be required.

Although the second tabs 31 have been described as being positioned at the end of the longitudinal member where the tabs 15 are located and extending upwardly similar to the tabs 15, it should also be noted that additional tabs (not shown) substantially similar to tabs 17 could also be positioned spaced apart from the end of the longitudinal members where the tabs 17 are located. The second tabs on this end of the longitudinal members would extend downwardly like the tabs 17 and would be spaced apart from the end of the longitudinal members a distance in the same range as the second tabs 31. It should also be recognized that second tabs can be positioned on both ends of the longitudinal members if this degree of structural rigidity is required for the scale.

FIGS. 5, 6, 7 and 8 show alternative embodiments for the scale or straight edge of this invention. In FIG. 5 longitudinal members 35 are constructed so they form a scale 36 having a substantially triangular cross section. On one side of a scale base portions 37 extends from the triangular shaped longitudinal members. The base portions 37 terminate at parallel edges 39. The edges 39 form a substantially straight edge along one side of the scale or straight edge. It should be noted that the edges 39 will maintain this substantially straight edge throughout the telescoping range of the straight edge or scale.

In FIG. 6 the slidably telescoping longitudinal members 45 are constructed so that they form a scale 46 having a substantially square cross section. On one side of the square configuration base portions 47 extend from the longitudinal members. The base portions terminate at parallel edges 49. The edges 49 form a substantially straight edge and the edges will maintain this substantially straight edge throughout the telescoping range of the longitudinal members.

FIG. 7 shows a scale 54 having longitudinal members 55 that are arranged in a configuration that has a substantially circular cross section. Base portions 57 extends from one side of the longitudinal members and the base portions terminate in edges 59. The edges 59 form a substantially straight edge and the edges 59 maintain this substantially straight edge throughout the telescoping range of the straight edge or scale.

FIG. 8 shows another embodiment of the straight edge or scale 64 of this invention. In this embodiment the generally C-shaped longitudinal members 65 are positioned in slidably telescoping relationship. Each of the longitudinal members 65 has two coplanar base portions 67 that terminate at parallel edges 69. The edges 69 form substantially straight edges along each side of the straight edge or scale 64. The edges 69 maintain the straight edge throughout the telescoping range of the straight edge or scale.

Turning now to FIG. 9, still another embodiment of a straight edge or scale 75 of this invention is shown. The scale 75 includes a plurality of longitudinal members 76, of which two are shown. Each of the longitudinal members 75 has two coplanar base portions 77 which terminate at downwardly bent edges 78. The downwardly turned edges 78 for the abutting coplanar base portions 77 terminate in a vertical straight line 79 for defining a straight edge as the sections or members 76 are telescoped. The downwardly turned edges 78 space the base portions 77 from a work surface, such as a drawing, to reduce the risk of speering or marking the work surface. The longitudinal members 76 are provided with concave sides 80 which facilitate gripping the scale 10 for lifting from a work surface. Each concave side 80 is connected to a base portion 77 by a joint having a generally C-shaped cross section. The adjacent telescoping members 76 frictionally engage each other only at the C-shaped portion 81. Through this arrangement, the members 76 are easily telescoped but engage each other with sufficient force to add rigidity to the scale 75 and to prevent the scale 75 from accidentally telescoping in or out.

A number of configurations, having different cross sectional shapes, have been shown for the straight edge or scale of this invention. However, it should be noted that other configurations for the longitudinal member of the scale would also be used in this invention. It also should be noted that the straight edges or scales of FIGS. 5-8 will be provided with suitable stops or tabs to limit telescoping for maintaining rigidity of the extended scales. These tabs or stops may be similar to the tabs 15 and 17 in FIGS. 1-3 and the tabs 31 in FIG. 4, for example. Accordingly, it will be apparent to those skilled in the art that various modifications may be made to the preferred embodiment described above without departing from the spirit and scope of the following claims.

What we claim is:

1. A straight edge comprising a plurality of longitudinal members positioned together in a telescoping relationship, one of said members defining an outer member and another of said members defining an inner member, each of said members having at least one longitudinal edge, said edges forming a substantially straight edge throughout the telescoping range of said members and graduation means along said edges for indicating a measurement, each of said longitudinal members having sidewalls, a top wall connecting said sidewalls and at least one base portion extending outwardly from one of said sidewalls, said base portions terminating in said longitudinal straight edges, said outer member having an end wall that extends from said top wall to said base portion of said outer member to substantially enclose one end of said straight edge, said inner member having a projection located on an end thereof spaced apart from said end wall of said outer longitudinal member, said projection extending from said end of said inner member in a direction toward said top wall of said outer member, and wherein each longitudinal member except said outer longitudinal member has a tab located at the end of such member closest to said end wall of said outer member, said tabs extending upwardly from said ends of said members and abutting said top wall of the adjacent outer one of said longitudinal members.

2. The straight edge of claim 1 wherein each of said longitudinal members except said inner longitudinal member has a tab located at an end of such member spaced apart from said end wall of said outer member, said tabs extending downwardly from said spaced end of each of said members and abutting said top wall of an adjacent inner one of said members.

3. A straight edge comprising at least three longitudinal members positioned together in slidable telescoping relationship to move between extended and collapsed positions, one of said members defining an outer member, another of said members defining an inner member and the remainder of said members defining intermediate members between said inner and outer members, each of said members having at least one longitudinal edge, said edges forming a straight edge through the telescoping range of said members, graduation means along said edges for indicating a measurement, means for limiting telescoping of said members in one direction to confine said intermediate and inner members within said outer member when in the collapsed position, tab means on each of said members extending between each two adjacent members for limiting telescoping of said members in the other direction to the extended position, said tab means between each two adjacent members projecting in opposite directions to abut when said members are telescoped to the extended position, and a projection located on said inner member, said projection facilitating extending the straight edge from the collapsed position to the extended position.

* * * * *